United States Patent
Wallace

(10) Patent No.: US 10,526,224 B2
(45) Date of Patent: Jan. 7, 2020

(54) DESALINATION INTAKE SYSTEM WITH NET POSITIVE IMPACT ON HABITAT

(75) Inventor: Paul Steven Wallace, Katy, TX (US)

(73) Assignee: HL Seawater Holdings, LLC, Houston, TX (US)

( * ) Notice: Subject to any disclaimer, the term of this patent is extended or adjusted under 35 U.S.C. 154(b) by 1738 days.

(21) Appl. No.: 13/118,326

(22) Filed: May 27, 2011

(65) Prior Publication Data

US 2011/0297595 A1 Dec. 8, 2011

Related U.S. Application Data

(60) Provisional application No. 61/350,734, filed on Jun. 2, 2010.

(51) Int. Cl.
| | | |
|---|---|---|
| *B01D 35/02* | (2006.01) | |
| *E02B 5/08* | (2006.01) | |
| *C02F 1/68* | (2006.01) | |
| *C02F 9/00* | (2006.01) | |
| *E02B 1/00* | (2006.01) | |
| *C02F 1/00* | (2006.01) | |
| *C02F 1/50* | (2006.01) | |
| *C02F 1/66* | (2006.01) | |

(Continued)

(52) U.S. Cl.
CPC ............... *C02F 9/00* (2013.01); *E02B 1/006* (2013.01); *C02F 1/001* (2013.01); *C02F 1/008* (2013.01); *C02F 1/50* (2013.01); *C02F 1/66* (2013.01); *C02F 1/74* (2013.01); *C02F 2103/08* (2013.01); *C02F 2209/42* (2013.01); *C02F 2303/04* (2013.01); *C02F 2303/24* (2013.01)

(58) Field of Classification Search
CPC .......... A01K 61/002; E02B 1/006; E02B 9/04
See application file for complete search history.

(56) References Cited

U.S. PATENT DOCUMENTS

| | | | |
|---|---|---|---|
| 3,526,209 A * | 9/1970 | Budge et al. | ................. 119/237 |
| 4,127,235 A | 11/1978 | Klaile et al. | |
| 4,163,046 A | 7/1979 | Subramanian et al. | |

(Continued)

FOREIGN PATENT DOCUMENTS

WO 2007094659 A1 8/2007

OTHER PUBLICATIONS

McDonald, M. R., McClintock, J. B., Amsler, C. D., Rittschoff, D., Angus, R. A., Orihuela, B. & Lutostankski, K., "Effects of Ocean Acidification Over the Life History of the Barnacle *Amphibalanus amphitrite*," Marine Ecology Progress Series 385:179-187 (2009).

(Continued)

*Primary Examiner* — Bobby Ramdhanie
*Assistant Examiner* — Denise R. Anderson
(74) *Attorney, Agent, or Firm* — Fletcher Yoder, P.C.

(57) ABSTRACT

An environmentally supportive seawater intake system includes a first filtering system in communication with raw seawater for providing a flow of seawater in a first direction into a raceway. A second filtering system is also in communication with seawater in the raceway and is adapted to receive a portion of the seawater in the raceway and directing it in a second direction away from the flow of residual water in the raceway. An input device receives the second portion flowing in the second direction, and a recovery system receives and returns the first, residual portion to the sea environment.

28 Claims, 4 Drawing Sheets

(51) Int. Cl.
*C02F 1/74* (2006.01)
*C02F 103/08* (2006.01)

(56) References Cited

U.S. PATENT DOCUMENTS

| | | | |
|---|---|---|---|
| 4,298,442 A | 11/1981 | Giuffrida | |
| 4,381,232 A | 4/1983 | Brown | |
| 4,405,463 A | 9/1983 | Jost et al. | |
| 4,436,429 A | 3/1984 | Strong et al. | |
| 4,725,425 A | 2/1988 | Lesher et al. | |
| 5,004,534 A * | 4/1991 | Buzzelli | B01D 21/003 210/164 |
| 5,221,528 A | 6/1993 | Jongema | |
| 5,250,185 A | 10/1993 | Tao et al. | |
| 5,366,514 A | 11/1994 | Becnel, Jr. et al. | |
| 5,417,491 A | 5/1995 | Hornung et al. | |
| 5,765,945 A | 6/1998 | Palmer | |
| 5,858,240 A | 1/1999 | Twardowski et al. | |
| 5,925,255 A | 7/1999 | Mukhopadhyay | |
| 6,030,535 A | 2/2000 | Hayashi et al. | |
| 6,036,740 A | 3/2000 | Miller et al. | |
| 6,183,644 B1 | 2/2001 | Adams et al. | |
| 6,461,491 B1 | 10/2002 | Hryn et al. | |
| 6,482,305 B1 | 11/2002 | Mani | |
| 6,682,651 B1 * | 1/2004 | Toland et al. | 210/155 |
| 6,863,829 B2 * | 3/2005 | Sasaki et al. | 210/749 |
| 6,964,541 B2 * | 11/2005 | Bryan | 405/81 |
| 7,083,730 B2 | 8/2006 | Davis | |
| 7,147,361 B2 | 12/2006 | Cecala et al. | |
| 7,392,848 B1 | 7/2008 | Bader | |
| 7,459,088 B2 | 12/2008 | Davis | |
| 7,501,064 B2 | 3/2009 | Schmidt et al. | |
| 7,595,001 B2 | 9/2009 | Arakel et al. | |
| 7,861,955 B2 | 1/2011 | Tracy et al. | |
| 2005/0284394 A1 * | 12/2005 | Lindgren | 119/215 |
| 2007/0189945 A1 | 8/2007 | Kopp et al. | |
| 2008/0185340 A1 | 8/2008 | Bargeman et al. | |
| 2008/0237123 A1 | 10/2008 | Marston | |
| 2009/0127360 A1 | 5/2009 | Tracy et al. | |
| 2010/0163471 A1 | 7/2010 | Elyanow et al. | |
| 2011/0198285 A1 | 8/2011 | Wallace | |
| 2011/0289846 A1 | 12/2011 | Shaw et al. | |
| 2011/0303607 A1 | 12/2011 | Vora et al. | |

OTHER PUBLICATIONS

Markus Busch, William E. Mickols, Steve Jons, Jorge Redondo, Jean De Witte, "Boron Removal in Sea Water Desalination," International Desalination Association, BAH03-039 (2003).
NRS Engineering Water Solutions, "Final Pilot Study Report—Texas Seawater Desalination Demonstration Project," (Oct. 2008).
Collin Green "Using Gypsum for the Treatment of Mine Water," Department of Chemical and Metallurgical Engineering, Faculty of Natural Sciences, Technikon Pretoria (Dec. 2003).
Stephen R. Grattan "Irrigation Water Salinity and Crop Production," University of California, Davis—Agriculture and Natural Resources, ANR Publication 8066 (2002).
Ittai Gavrieli Amos Bein, and Aharon Oren, "The Expected Impact of the Peace Conduit Project (The Red Sea-Dead Sea Pipeline) on the Dead Sea," Mitigation and Adaptation Strategies for Global Change, 10:3-22 (2005).
DOW Water Solutions, "Filmtec™ Reverse Osmosis Membranes," Technical Manual, Form No. 609-00071; (2010) pp. 1-180.
DOW Water Solutions, "DOWTM Filmtec™ Membranes—DOW™ Filmtec™ SW30XLE-440i Seawater Reverse Osmosis Element with iLEC Interlocking Endcaps," Product Information. Form No. 609-03003-1109; (2010) pp. 1-2.
DOW Water Solutions, "DOW™ Filmtec™ Membranes—DOW™ Filmtec™ SW30ULE-440i Seawater Reverse Osmosis Element with iLEC™ Interlocking Endcaps," Product Information, Form No. 609-03004-1109; (2010) pp. 1-2.

DOW Water Solutions, "Filmtec™ Membranes—Filmtec™ XLE-440 Extra Low Energy RO Element," Product Information. Form No. 609-00245-0606; (2010) pp. 1-2.
DOW Water Solutions, "DOW™ Ultrafiltration—High Turbidity and Temperature Fluctuation No Obstacle for DOW™ Ultrafiltration," Case History, Form No. 795-00020-1108; (2010) pp. 1-5.
FAO Corporate Document Repository, Agriculture and Consumer Protection, "Water Quality for Agriculture"; http://www.fao.org/DOCREP/003/T0234E/TO234E05.htm (Feb. 10, 2010) pp. 1-15.
Seung-Hyun Kim, Jong-Sup Yoon, Seockheon Lee, "Utilization of Floc Characteristics for the Evaluation of Seawater Coagulation Process," Desalination and Water Treatment, Civil Engineering Department, Kyungnam University, Masan, Korea, 10 (2009) 95-100. *Presented at EuroMed 2008.
GE Water and Process Technologies, "Cloromat—Solution for Manufacturing Chlor-Alkali Chemicals: Sodium Hypochlorite, Hydrochloric Acid & Caustic Soda," Fact sheet (May 2008) p. 1-4.
GE Power & Water—Water & Process Technologies, "HERO" (2010) pp. 1-2.
ICL, "Harnessing Nature Creating Value," 3rd Annual NASDAQ-TASE Israeli Investor Conference, New York (Sep. 18, 2008) pp. 1-47.
Applied Membranes, Inc., "Water Treatment Guide—Temperature Correction Factor for Reverse Osmosis Membranes," (2007) pp. 1-2.
Nitto Denko and Hydranautics, "Chemical Pretreatment for RO and NF," Technical Application Bulletin No. 111, Revision C (Dec. 2008) pp. 1-16.
Chemical Processign.com, "To Avoid Silica-Scale Problems in Cooling Towers, Plant Personnel Turn to Unconventional Methods," Water Treatment's Gordion Knot; http://www.chemicalprocessing.com/articles/2003/235.html?page=print; (2003) pp. 1-9.
"Desalination: A National Perspective," Committee on Advancing Desalination Technology, National Research Council, The National Academies—Advisers to the Nation on Science, Engineering, and Medicine (2008) pp. 1-255.
Public Health and the Environment World Health Organization, "Desalination for Safe Water Supply—Guidance for the Health and Environmental Aspects Applicable to Desalination," Geneva (2007) pp. 1-173.
Gerald L. Mackie and Barb Crosbie, "Zebra Mussel Biofouling Control in Cottage and Other Small Volume Water Systems," The Georgian Bay Association (1999) pp. 1-87.
Ki-Won Baek, Sang-Hun Song, Seok-Hwan Kang, Young-Woo Rhee, Chang-Soo Lee, Bum-Jae Lee, Sam Hudson, and Taek-Sung Hwang, "Adsorption Kinetics of Boron by Anion Exchange Resin in Packed Column Bed," J. Ind. Eng. Chem., vol. 13, No. 3, (2007) 452-456.
EPA Selenium Purification_Scandium (1998) pp. 1-62.
Yoshinobu Tanaka, Reo Ehara, Sigeru Itoi, Totaro Goto, "Ion-exchange membrane electrodialytic salt production using brine discharged from a reverse osmosis seawater desalination plant," Journal of Membrane Science 222 (2003) 71-86.
Reclamation—Managing Water in the West, Desalination and Water Purification Research and Development Program Report No. 135, Pilot Testing of Zero-Discharge Seawater Desalination—Application to Selenium Removal from Irrigation Drainage, U.S. Department of the Interior Bureau of Reclamation, Apr. 2008, pp. 1-37.
Sallie J. Lee, Frank J. Liotta, Steven A. Schwartz, "A New Generation of Gypsum Dispersing Agents," Global Gypsum Conference 2003—Barcelona, Sep. 14-16, 2003, pp. 17.1-17.12.
T. Masuzawa, "Impurities Contained Inside the Crystals of Solar and Vacuum Evaporated Salts," Fifth International Symposium on Salt—Northern Ohio Geological Society, May 29-Jun. 1, 1979, Hamburg, Germany, pp. 463-473.
Seung Joon Kim, Young Geun Lee, Sanghoun Oh, Yun Seok Lee, Young Mi Kim, Moon Gu Jeon, Sangho Lee, In. S. Kim, Joon Ha Kim, "Energy saving methodology for the SWRO desalination process: controrl of operating temperature and pressure," Desalination 249 (2009) 260-270.

(56) References Cited

OTHER PUBLICATIONS

Peter Eriksson, Markus Kyburz, Wil Pergande, "NF membrane characteristics and evaluation for sea water processing applications," Desalination 184 (2005) 281-294.
EPA Selenium Purification (1991) pp. 1-8.

* cited by examiner

DESALINATION INTAKE SYSTEM WITH NET POSITIVE IMPACT ON HABITAT

CROSS-REFERENCE TO RELATED APPLICATION

This application is a completion of the U.S. Provisional patent application Ser. No. 61/350,734, filed on Jun. 2, 2010 by the inventor hereof, and entitled: "DESALINATION INTAKE SYSTEM WITH NET POSITIVE IMPACT ON HABITAT". This application claims full priority based on the provisional application, which is incorporated in its entirety herein by reference.

BACKGROUND

1. Field of the Invention

The invention is generally related to intake systems for seawater desalination systems and is specifically directed to a desalination intake system having a net positive impact on habitat.

2. Discussion of the Art

Fish and larvae entrapment and entrainment losses are a key environmental issue for desalination plants. Desalination plants are often located in ecologically sensitive coastal estuaries. The juvenile fish larvae, which are abundant in these waters, are killed when they are entrained or entrapped in desalination plant intake systems.

Screened intake systems have been developed for power plants that reduce entrainment and entrapment, but these cannot always be successfully applied at industrial waterfront sites. These sites are optimal locations for large scale desalination plants due to the large demand for high quality water. In addition, even the best screen system with fish return capability is only able to reduce entrainment by 85-90% versus an unscreened open ocean intake. This still results in a significant loss of fish and larvae due to the high concentration of sea life in the near shore environment.

Travelling screens with fine mesh (0.5 mm) have been used in once through seawater cooled power plants. These travelling screens achieve about an 85% removal efficiency. However, these systems require a fish return system that routes the recovered fish and larvae away from the intake system. For once through power plant cooling water, the fish and larvae can be routed to the discharge cooling water or a separate fish channel. These are typically located a significant distance away from the intake to prevent re-ingestion of the discharge cooling water or fish.

Once through power plants use large flows and low temperature rises (about 10° F.). Thus, the returned fish and larvae can survive in the discharge cooling water, or in a fish discharge channel, which is near the cooling water discharge.

Desalination plants have a discharge stream that has a high brine concentration. In addition it may contain anti-scalant and water treating chemicals. Any returned fish or larvae must be discharged away from the inlet and away from the discharge line. This makes placement of the intake, discharge and fish return especially difficult in an industrial area where seafront acreage is limited. Intake and outfall pipelines have been used; but, these are expensive and may interfere with navigation (dredged ship channels).

Travelling screens also have a high mortality rate for fish and larvae impinged on the screen and subsequently returned. Overall mortality rates of about 50% are typical for Gulf of Mexico water temperatures, even for modified travelling screens with fish buckets. The stress of impingement and reduced oxygen content in the water cause this high mortality.

Angled screens with sweeping water flow to a bypass fish channel have been effective in reducing mortality in river applications. The sweeping flow and bypass channel allow the fish and larvae to pass by the face of the screen without becoming impinged. However, typical seawater sites have alternating weak tidal currents, which are insufficient to sweep the fish by the face of the screen.

Wedgewire passive screens have been proven to be about 85-90% effective in removing fish and larvae from seawater intakes. However, in order to achieve this effectiveness, the following conditions must be met:
1) Small opening size (about 0.5 mm)
2) Slow velocity through the opening (about 0.5 ft/s)
3) Significant sweep velocity across the face of the screen (>1 ft/s)

The first two conditions require significant screen surface area. For large desalination plants, this can be impractical due to site restrictions. This is especially true for industrial or ship channel locations where waterfront real estate is limited.

The third condition also is difficult to achieve in seawater conditions since tidal currents are alternating. Depending on location, the tidal currents may not reliably generate the sweeping velocities needed to prevent entrainment and entrapment on the screen.

Subsurface intakes use horizontal or vertical beach wells to supply seawater to the desalination plant. Subsurface wells are effective at preventing entrainment and entrapment since the sea floor acts as an effective filter, thereby removing essentially all sea life. However, subsurface intakes require a high porosity sea bed to provide a sufficient flow of seawater to support a commercial desalination plant. At many locations the sea bed porosity is too low to support a commercial desalination unit. In addition, there is a long term risk of damaging coastal aquifers with salt water intrusion.

Many of the world's estuaries are stressed due to reduced fresh water flows. On the U.S. Gulf Coast, this has led to oyster reef habitat destruction. In addition to producing oysters, oyster reefs provide habitat for juvenile fish. Oysters are attacked by parasites (dermo-protozoan, oyster drill—snail) when insufficient spring flood freshwater pulses enter the estuary. Upstream dams on the rivers feeding the estuaries are typically constructed to capture the spring floodwater for agricultural, municipal, and industrial use. Although minimum flows are supplied to the estuary on a year round basis, the cleansing effect of a spring flood event is no longer available.

Ship channels have also been dredged through estuarial bays. This facilitates commerce, but can increase estuary turbidity and channel tidal flows. Fertilizer runoff also enters the estuary in higher concentrations due to the reduced inlet water flows. The reduced tidal flows, higher fertilizer concentration, and higher turbidity can lead to hypoxic conditions in the estuary. This leads to additional oyster reef habitat destruction.

It remains, therefore, desirable to provide a seawater intake system that can be employed in commercial desalination systems near shorelines where the fresh water is required with a minimum of environmental impact on the fragile sea life dependent upon the coastal waters.

SUMMARY OF THE INVENTION

Embodiments of this invention involve an integrated intake and reef system which feeds seawater to a desalination plant, but has a net positive impact on the adjacent seawater habitat.

This is achieved by an intake system with the following attributes:
A desalination intake system with minimal (about 10%) impingement and environment losses; and
An optimized reef ecosystem.

In the intake system of the subject invention seawater flows at low velocity (about 0.5 ft/s) through a grating into an inlet raceway. A baffle at the top of the grating prevents fish and larvae rich surface water from entering the raceway. The bottom of the grating is located above the bottom to prevent significant amounts of sediment from being entrained into the raceway.

Seawater in the raceway is accelerated in the raceway to about 1.5-2 ft/s. This can be achieved by providing the raceway with a smaller cross section than the inlet grating. This ensures that settling of sediment will substantially not occur in the raceway. Wedgewire screens with about a 0.5 mm gap, about a 0.5 ft/s through screen velocity, and about a 1-2 ft/s cross flow/channel velocity are installed parallel to the flow direction in the raceway. A portion of the seawater in the raceway is pulled through the wedgewire screen. The combination of small opening size, low through screen velocity, and high cross flow screen outer surface velocity minimizes fish and larvae entrainment and entrapment on the screens.

Multiple wedgewire screens are used in series in the raceway channel. Under the optimized conditions in the raceway, the wedgewire screens typically entrain or entrap less than about 10% of the fish and larvae in the seawater.

The filtered seawater that is pulled through the screen is acidified to a pH of about 6.5 and is periodically disinfected with a biocide. The acidified and periodically disinfected seawater enters an enclosed sump and a submerged or sump pump is used to pump the seawater out of the sump to the desalination plant. The reduced pH and biocide prevent biological growth in the sump, pump and seawater pipeline to the desalination plant. The pumps and screen pressure drop maintain the sump level below the level in the raceway. This prevents backflow or leakage of disinfected seawater into the raceway.

An interlock system shuts off the acid and biocide injection if the level or pressure differential becomes too low.

The residual seawater containing the bulk of the fish and larvae exits the raceway and enters a rear transfer pond. The rear transfer pond is connected to two reef ponds each equipped with transfer pumps. These pumps are fish friendly pumps with proven low (5%) mortality rates (fish friendly low speed impeller pump, Venturi jet pump, air lift pump). The transfer pumps are operated so that the residual seawater from the raceway is pumped into the reef that is down current from the inlet. During times of slack tide or no cross flow tidal current, both transfer pumps are operated in parallel. A variable speed drive on the pumps or compressor (air lift system) provides transfer pump flow adjustment. An aerator located in the transfer pump plume aerates the water being transferred into the reef (not used for air lift pump).

In addition to a large raceway transfer pump, each reef is equipped with a smaller reef level control pump. The reef level control pump pumps water out of the reef into the rear transfer pond. This pump extracts seawater from the reef that is not receiving the flow from the raceway. This ensures a positive flow of seawater into the reef during all tidal conditions. This is important during outgoing tide conditions since the outlet of the non-circulating reef is up current from the outlet. Thus, any outgoing tidal flow from this reef could be re-ingested into the raceway inlet. With a Venturi pump, a reef level control pump is not required since reef water will backflow through the non-operating Venturi. A rotating disk may be required to limit the back flow through the Venturi, to ensure that the bulk of the flow into the rear transfer pond comes through the raceway.

The aerated water from the rear transfer pond enters the reef pond. The reef depth and bottom composition are selected to optimize fish, larvae, shellfish and micro-algae growth, maximizing reef productivity. In addition, periodic pulses of brackish desalinated water from the desalination plant, and clarified storm water runoff are used to flush the reef. This provides optimized water chemistry, and substrate conditions for reef productivity.

The subject invention is directed to an environmentally supportive seawater intake system having a first filtering system in communication with raw seawater for providing a flow of seawater into a raceway. A cross-flow filtering system is in communication with the seawater in the raceway. A portion of the raceway seawater is drawn through the cross-flow filtering system for delivery as intake water. The residual portion of seawater in the raceway continues to flow in the first direction and with the drawn water being separated and flowing along a different path to be used as intake water. An input device receives the intake water, and a recovery system receives and returns the first, residual portion to the sea environment.

In one embodiment of the invention, the seawater intake system is adapted for generating and transferring screened seawater to a desalination plant. An intake screen having an operable cross-section for screening and passing raw seawater for creating screened intake seawater is in communication with a raceway, wherein the operational cross-sectional area of the intake screen is larger than the operational cross-sectional area of the raceway, and wherein the flow rate through the raceway is approximately 1.5-2 times the flow rate through the intake screen. A cross flow screen is located in the raceway and in communication with the seawater in the raceway for permitting the flow of screened cross flow water in a direction which is in cross flow with the seawater in the raceway to create a first, residual portion of the seawater flowing in the direction of the raceway and a second, filtered portion of seawater flowing in a direction cross flow to the raceway. The system includes an intake flow system comprising of a sump for receiving the second portion of seawater and a pump for discharging the second portion of seawater into an intake port of the desalination plant. A recovery system receives and delivers the first, residual portion of seawater to a reef pond. The recovery system includes a transfer pond for receiving the first, residual portion of seawater, and a pumping system for pumping the first, residual portion of seawater from the pond into the reef pond.

DETAILED DESCRIPTION

The seawater intake system provides, but is not limited to, the following benefits:

1) Provides a desalination plant intake with a net overall improvement in the seawater habitat.

2) Has a small waterfront space requirement, and is suitable for installation on a commercial ship channel. The intake does not pose any hindrance to navigation.

3) Coupled with the high efficiency desalination design (about 99% desalination recovery), substantially reduces NPV in habitat mitigation costs versus an unscreened design or conventional travelling screen for about a 30 MGD desalination plant.

4) Adapts to alternating tidal flows during operation, and does not require a minimal tidal current velocity to sweep intake screens.

5) Requires a small reef size for full intake mitigation due to the high effectiveness of the intake screening (about 90%), and the high productivity of the reef (desalination flooding, optimized bottom and aeration). The small reef size enables it to be integral to the desalination plant.

The system of the subject invention permits:

1) Co-location of the oyster or coral reef and desalination intake. The desalination intake provides a constant flow of nutrients (seawater). Fish and larvae are swept by the intake screens into the reef, thereby minimizing entrainment and entrapment losses. The adjacent reef system also provides an effective recovery area for the juvenile fish, minimizing mortality.

2) Use of a raceway perpendicular to the waterfront. This simultaneously provides constant high cross flow velocity (independent of fluctuating tidal currents) and large surface area for effective use of wedgewire passive screens.

3) Use of hatchery type circulation devices (e.g. air lift pump, venture pump, or fish friendly impeller) to provide circulation in the intake system.

4) Use of dual reefs in alternating operation to prevent re-ingestion of fish and larvae rich reef effluent. This allows the intake system to be operated so that it dynamically adapts to any tidal conditions of a specific site.

5) Use of pulses of brackish (low quality) desalinated water to periodically flush the reef.

6) Use of air from the screen backflush system to aerate the water entering the reef system.

Figure 1:
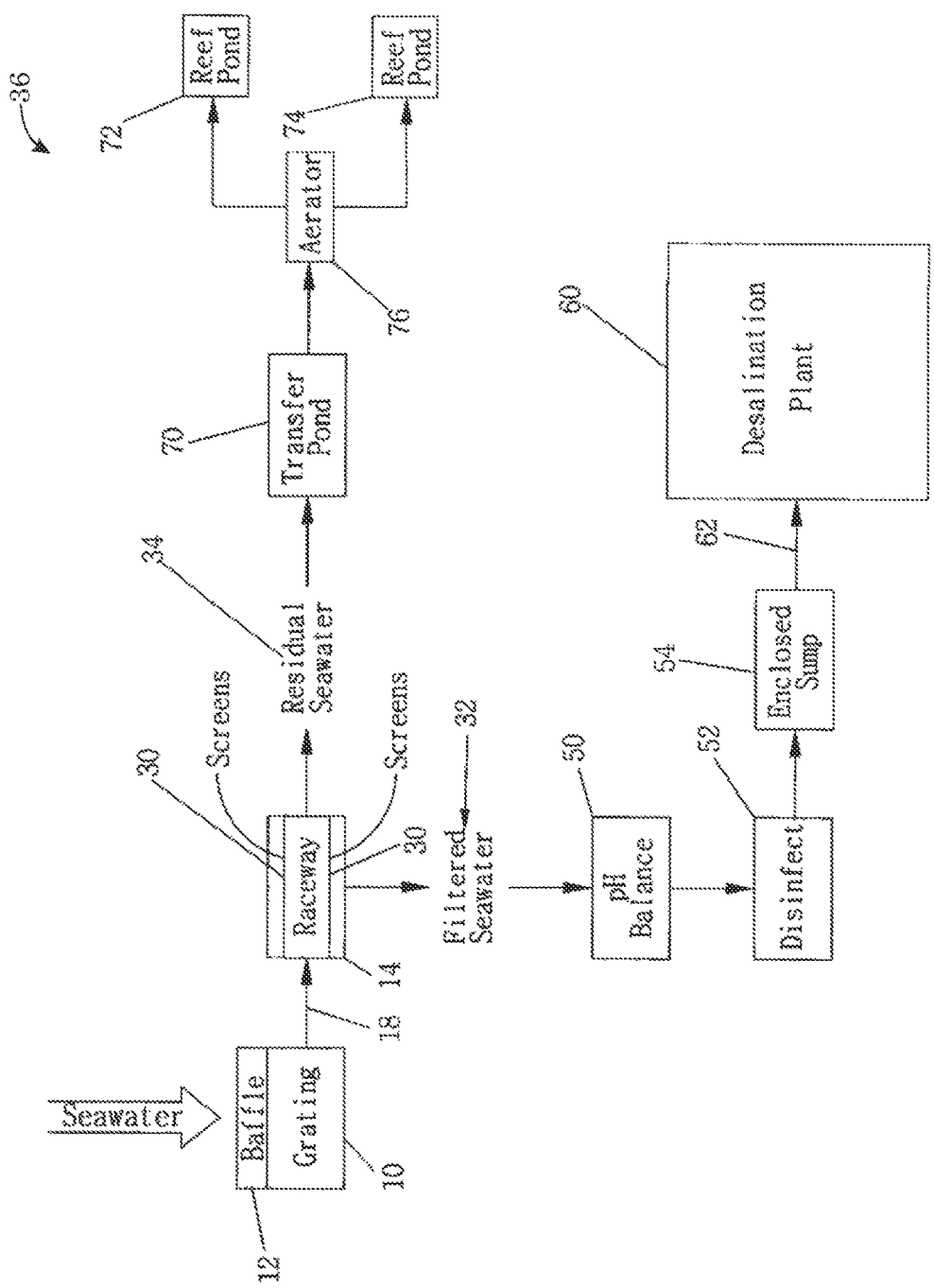
FIG. 1 is a system overview of the seawater intake system of the subject invention.

With specific reference to FIG. 1, the system includes a grated intake 10 with a baffle 12 upstream of the grated intake 10. Seawater passes through the baffle and through the grating and into a raceway 14.

Figure 2:
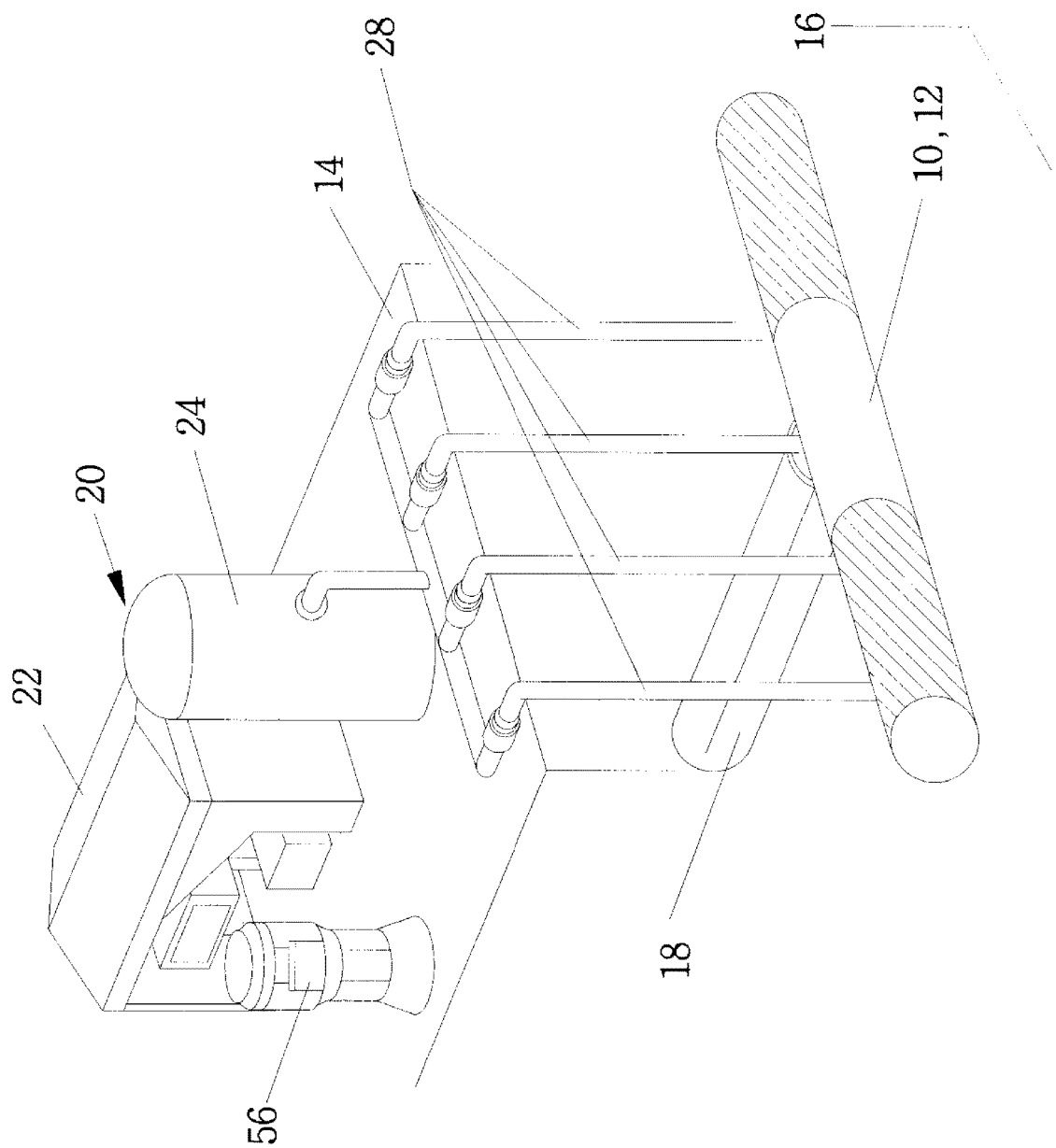
FIG. 2 is an example of the intake structure for use in combination with the overall system, utilizing a low impact wedgewire seawater intake.

A typical intake grating system may be low impact seawater wedgewire intake system shown in FIG. 2. As there shown, the baffle and screen intakes are positioned above the sea floor to prevent significant amounts of sediment from being entrained into the raceway. The outlet of the grating system is coupled to a raceway module 14 via the conduit 18. An air blast system 20 permits self-cleaning of the grate and baffle system by using an air blast back flush and, at the same time, increases the dissolved oxygen in the intake system. As shown, the air blast system 20 comprises a compressor 22 and tank 24, connected to the intake grating system via a series of conduits 28. The compressor 22 and various pumps, as later described, are powered by a power supply 26, which may be, by way of example, a free standing generator.

The grated seawater is introduced into the raceway system 14 via the conduit 18. The raceway has a lower open cross-section than the grating system, whereby the seawater is accelerated as it passes from the grating system through the raceway. Typically, the flow of seawater through the grating system is about 0.5 ft/s, whereas the flow through the raceway is increased to between 1 ft/s and 2 ft/s. This ensures that settling of sediment will be minimized in the raceway.

As shown in FIG. 1, wedgewire screens 30 are positioned parallel to the flow of seawater through the raceway 14. The wedgewire screens 30 are sized to permit a cross flow through the raceway which is approximately 1.5-2 times the through flow. In a typical example, the through flow of seawater through the raceway will be approximately 1 ft/s to 2 ft/s and the cross flow through the screens 30 will be approximately 0.5 ft/s. As will be further described, a portion of the seawater (filtered seawater 32) in the raceway is drawn through the screens 30 for delivery as intake water. The residual seawater 34 is released to a recovery system 36 having a transfer pond, as will be described.

Figure 3:
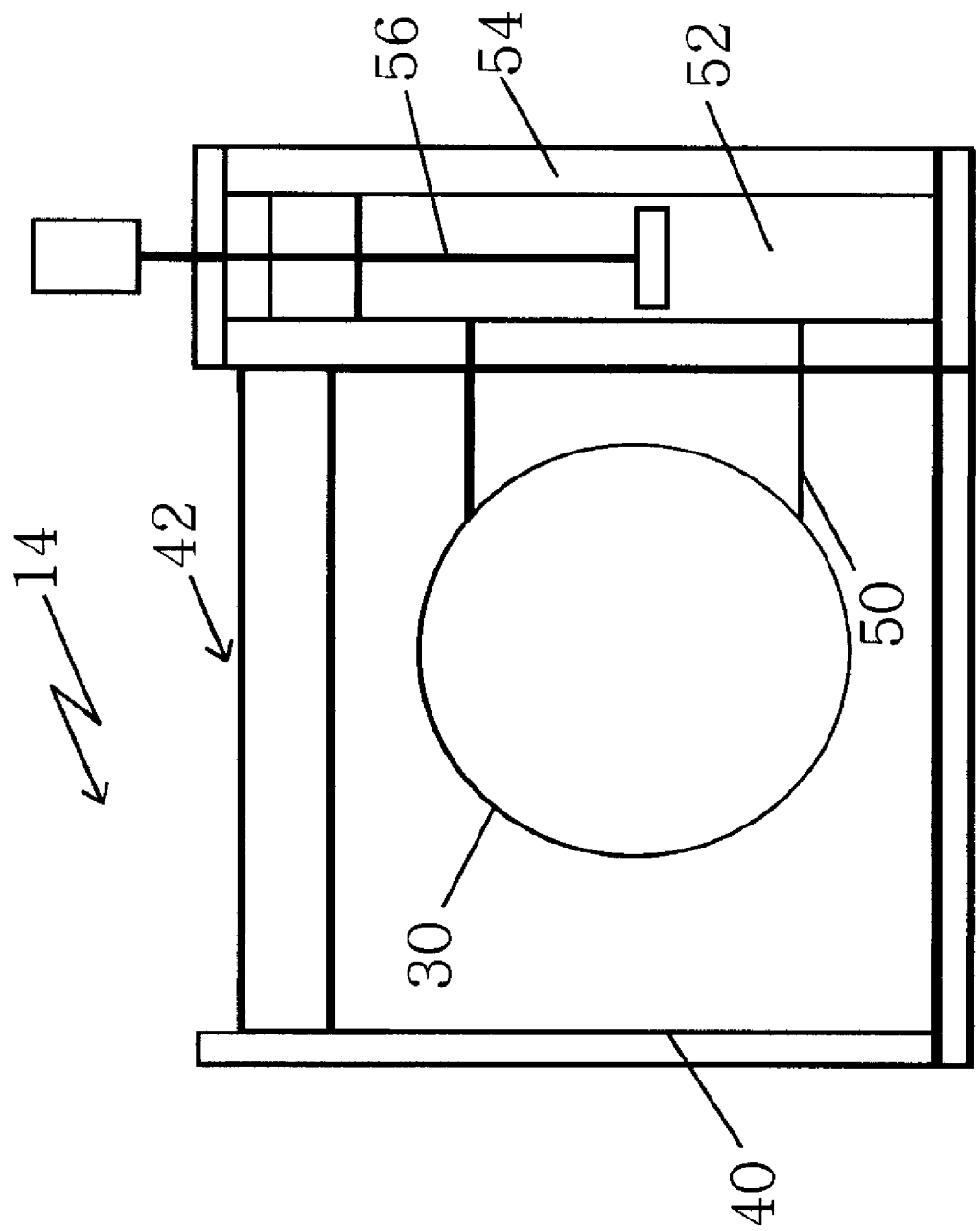
FIG. 3 is a diagrammatic view of an exemplary raceway and screen design in accordance with the subject invention.

A diagrammatic view of a typical raceway 14 in accordance with the subject invention is shown in FIG. 3. As there shown, the seawater released by the grating system 10 is flowing perpendicular to the drawing. The raceway is a basically a walled container 40 having an open (or optionally closed) top 42, permitting the level of unfiltered seawater in the raceway to rise and fall with the tide. The unfiltered seawater in the raceway includes fish, larvae and the like. The screen(s) 30 extend the length of the raceway and run parallel to the flow of grated, unfiltered seawater. The cross flow at 1-2 ft's and 30-60 MGD passes through the screen 30, by drawing seawater in the raceway into a sump 54. This permits a portion of the grated seawater in the raceway to be pulled through the wedgewire screen from the raceway container 40.

The combination of small opening size, low through screen velocity (about 0.5 ft/s) and high cross flow screen outer surface velocity minimizes the entrainment and entrapment of fish and larvae on the screens and in the water. Multiple screens may be used in series to further reduce the entrainment and entrapment of fish and larvae. It has been shown that less than 10% of the fish and larvae are entrained or entrapped using the raceway system of the subject invention.

As shown in FIGS. 1 and 3, the filtered seawater that passes through the screen 30 is introduced into a pH treatment system 50 and a periodically operated disinfecting system 52. Typically, the pH is acidified to 6.5 and the water is periodically disinfected with a biocide. The acidified and disinfected water enters an enclosed sump 54. A submerged pump or sump pump 56, powered by the power supply 26, pumps the seawater out of the sump 54 and to the desalination plant 60. The reduced pH and biocide prevent biological growth in the sump, pump and seawater pipeline 62 to the desalination plant 60. As shown in FIG. 3, the pressure drop through the screen 30 and by action of the pump 56 assures that the level in the sump is below the level in the raceway. This prevents backflow or leakage of disinfected seawater into the raceway. An interlock system may be provided to shut off the acid and biocide injection if the level or pressure differential becomes too low.

Turning again to FIG. 1, the residual seawater 34, which contains the bulk of the fish and larvae, exits the raceway and enters a rear transfer pond 70 of the recovery system 36. In the example, the rear transfer pond is connected to two reef ponds 72 and 74, each equipped with transfer pumps, not shown. These pumps are commercially available fish friendly pumps with proven low (<5%) mortality rates, such as, by way of example, low speed impeller pumps, Venturi jet pumps, air lift pumps and the like. The transfer pumps are operated so that the residual seawater from the raceway is pumped into the reef that is down current from the inlet. During times of slack tide or no cross flow tidal current, both transfer pumps are operated in parallel. A variable speed drive on the pumps or compressor (air lift system) provides transfer pump flow adjustment. An aerator 76 located in the transfer pump plum aerates the water being transferred into the reef. The aerator is not required for an air lift pump system.

In addition to a large raceway transfer pump, each reef 72, 74 may be equipped with a smaller reef level control pump (not shown). The reef level control pump discharges water out of the reef into the rear transfer pond 70. This pump extracts seawater from the reef that is not receiving the flow from the raceway. This ensures a positive flow of seawater into the reef during all tidal conditions. This is important during outgoing tide conditions since the outlet of the non-circulating reef is up current from the outlet. Thus, any outgoing tidal flow from this reef could be re-ingested into the raceway inlet. With a Venturi pump, a reef level control pump is not required since reef water will backflow through the non-operating Venturi. A rotating disk may be utilized to limit the back flow through the Venturi, to ensure that the bulk of the flow into the rear transfer pond 70 comes through the raceway.

The aerated water from the rear of the transfer pond 70 enters the reef ponds 72, 74. The reef depth and bottom composition are selected to optimize fish, larvae, shellfish and micro-algae growth in accordance with known practices, maximizing reef productivity. In addition, periodic pulses of brackish desalinated water from the desalination plant 60, and clarified storm water runoff may be used to flush the reef. This provides optimized water chemistry and substrate conditions for reef productivity.

Figure 4:
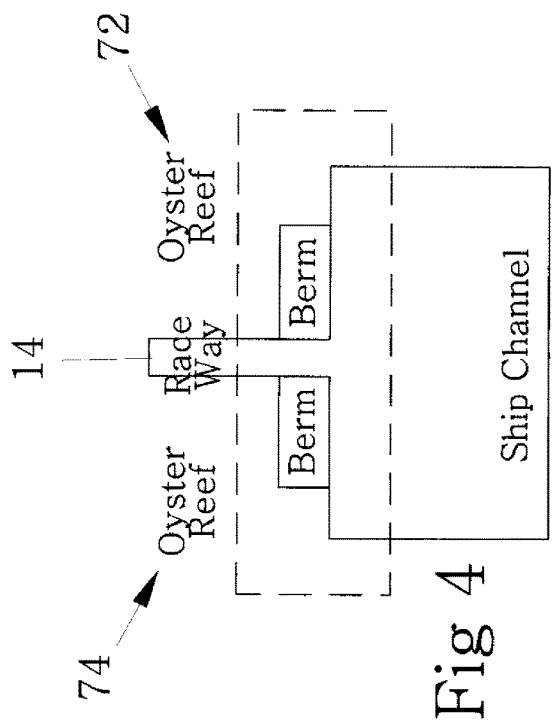
FIGS. 4 and 5 are diagrammatic installation layouts of a typical system incorporating the subject invention
Figure 5:
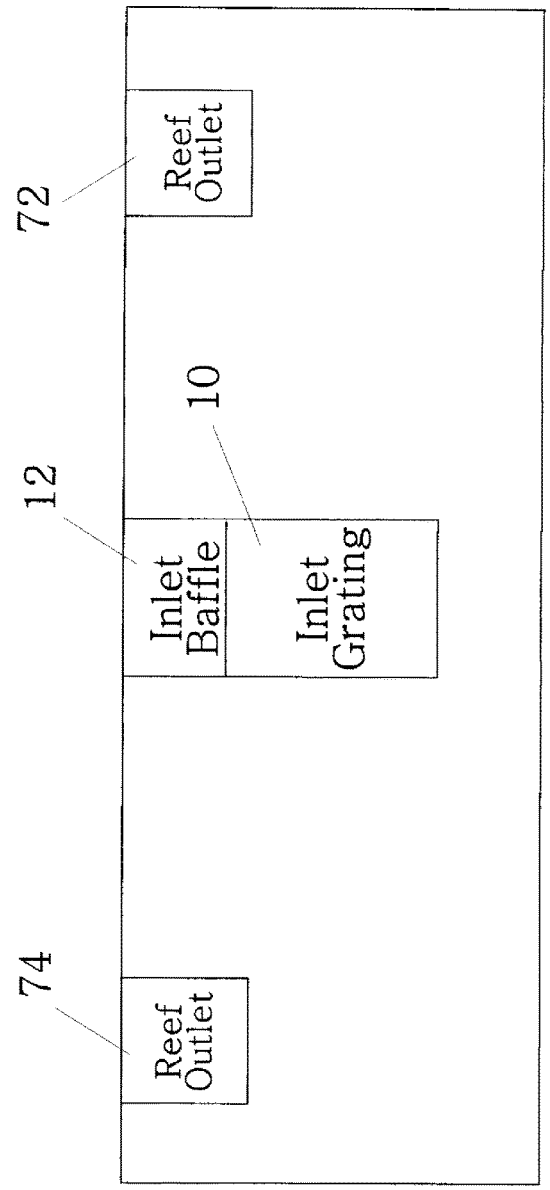

Plan and elevation views of the inlet and outlet design of a system incorporating the features of the subject invention are shown in FIGS. 4 and 5, respectively. As shown in FIG. 4, the raceway 14 is in communication with the berm 80 and the oyster reefs 72 and 74 are located outwardly therefrom. As shown in FIG. 5, the reef outlets are approximately 8 feet by 8 feet, and are positioned about 50 feet from the inlet baffle and grate system 10/12. The outlet flow velocity of the reefs is 0.4 to 0.7 ft/s and the inlet velocity of the baffle and grate system 10/12. Typically, the inlet baffle 12 extends 10 feet below the surface and the grate 12 extends 10 feet below that. The bottom of the grate 12 is approximately 15 feet above the seafloor. The inlet flow velocity of the baffle and grate system 10/12 is approximately 0.5 ft/s. The system of the present invention provides for lower salinity of the reef outlet above and separated from the inlet, and ensures that the lower density/salinity fish, larvae are in rich reef outlet water and not re-ingested. The system minimizes entrainment and entrapment losses and minimizes floating debris ingestion. By placing the inlet grating 10 above the seafloor no ship channel bottom water is input into the desalination plant intake and the intake of silt is minimized.

A comparison of the attributes of the intake system of the subject invention with conventional mitigation and travelling screen systems follows:

| Intake with Wedgewire Screen and Internal Reef | Invention | Mitigation | Travelling Screen |
|---|---|---|---|
| Desal Flow MGD | 30 | 30 | 30 |
| Desal Recovery MGD | 99% | 50% | 50% |
| Inlet Seawater Flow MGD | 30.3 | 60.0 | 60.0 |
| Unscreened Estuary Mitigation Area acre/MGD | 2 | 2 | 2 |
| Impingement + Entrainment Reduction % | 90% | 0% | 50% |
| Estuary Mitigation Area acre | 6.1 | 120.0 | 60.0 |
| Annual Estuary Fresh Water Requirement ft | 10 | 10 | 10 |
| Annual Estuary Fresh Water Requirement thousand gallons | 19,697 | 390,000 | 195,000 |
| Estuary Ave Flow MGD | 0.05 | 1.07 | 0.53 |
| Waterfront Property % | 10% | 100% | 100% |

A typical system operation utilizing the teachings of the subject invention is as follows:

| | |
|---|---|
| Raceway Discharge Flow MGD | 30 |
| Raceway Discharge Flow ft3/s | 46.41 |
| Screen Diameter ft | 5 |
| Raceway Height - High Tide ft | 8 |
| Raceway Height - low Tide ft | 7 |
| Raceway Width ft | 8 |
| Screen Cross flow Velocity at Raceway Discharge • | |
| High Tide ft/s | 1.046181 |
| Low Tide ft/s | 1.276332 |
| Screen Wire Width mm | 2.5 |
| Screen Opening Width mm | 0.5 |
| Screen Effective Area % of total circumference | 16.7% |
| Desal Inlet Flow MGD | 30 |
| Desal Inlet Flow ft3/s | 46.41 |
| Screen Slot Velocity ft/s | 0.5 |
| Screen Total Circumferential Area ft2 | 557.0 |
| Screen length ft | 35.5 |
| Intake Velocity | |
| Intake Flow MGD | 60 |
| Intake Flow ft3/s | 92.83 |
| Intake width ft | 8 |
| Intake depth ft | 20 |
| Intake Velocity ft/s | 0.58 |
| Outlet Velocity | |
| Outlet Flow MGD | 30 |
| Outlet Flow ft3/s | 46.41 |
| Outlet width ft | 8 |
| Outlet depth ft | 8 |
| Outlet Velocity ft/s | 0.72517 |
| Raceway Inlet Velocity | |
| High Tide ft/s | 1.45 |
| Low Tide ft/s | 1.66 |

I claim:

1. An environment supportive seawater intake system comprising:
   a grating system configured to receive seawater, to generate a first stream comprising fish and larvae, and to direct the first stream in a first direction;
   a raceway disposed downstream from the grating system and comprising a walled container having a base, a first sidewall, and a second sidewall, wherein the raceway comprises a raceway inlet disposed at a first end of the raceway and a raceway outlet disposed at a second end of the raceway, substantially opposite the first end, and the raceway is configured to receive the first stream from the grating system via a conduit extending between the grating system and the raceway inlet and to flow the first stream through the raceway along a flow path extending between the raceway inlet and the raceway outlet;
a filtering system disposed within the raceway and comprising a wedgewire screen positioned above the base and extending along a length of the first and second sidewalls between the raceway inlet and the raceway outlet such that the wedgewire screen circumscribes the flow path of the first stream along a length of the raceway, wherein the wedgewire screen is configured to remove at least a portion of the fish and larvae from the first stream to generate a filtered stream and to direct a flow of the filtered stream in a second direction;
an input device configured to receive the filtered stream from the filtering system; and
a recovery system fluidly coupled to the raceway outlet and configured to receive a residual stream having the fish and larvae from the first stream and to direct the residual stream to a sea environment.

2. The seawater intake system of claim 1, comprising a pH adjustment system disposed downstream of the filtering system and configured to receive the filtered stream.

3. The seawater intake system of claim 1, comprising a disinfectant system configured to receive the filtered stream.

4. The seawater intake system of claim 1, wherein the input device is an intake port of a desalination plant.

5. The seawater intake system of claim 1, wherein the recovery system is fluidly coupled to a reef pond in fluid communication with the sea environment.

6. A system comprising:
a desalination system configured to receive seawater from a seawater intake system, wherein the seawater intake system comprises:
a grating system configured to receive seawater, to generate a first stream comprising fish and larvae, and to direct the first stream in a first direction;
a raceway fluidly coupled to the grating system and comprising a raceway inlet disposed at a first end of the raceway and a first raceway outlet disposed at a second end of the raceway, substantially opposite the first end, wherein the first stream flows through the raceway along a flow path extending between the raceway inlet and the first raceway outlet, and wherein the raceway comprises a filtering system configured to receive the first stream from the grating system, the filtering system comprises a wedgewire screen positioned above a base of the raceway and extending along a length of the raceway between the first and second ends of the raceway such that the wedgewire screen circumscribes the flow path of the first stream along the length of the raceway, and the wedgewire screen is configured to remove at least a portion of the fish and larvae from the first stream to generate a filtered stream and a residual portion of the first stream;
a conduit extending between the grating system and the raceway inlet, wherein the conduit is configured to direct the first stream to the raceway;
a sump fluidly coupled to a second raceway outlet, separate from the first raceway outlet, and configured to direct the filtered stream to an intake of a desalination plant; and
a recovery system fluidly coupled to the first raceway outlet, wherein the recovery system is configured to receive the residual portion of the first stream from the raceway and to return the residual portion of the first stream to a sea environment.

7. The system of claim 6, comprising a pH adjustment system in fluid communication with the filtering system and the second raceway outlet, wherein the pH adjustment system is configured to adjust a pH of the filtered stream.

8. The system of claim 6, comprising a disinfectant system fluidly coupled to the filtering system and the second raceway outlet, wherein the disinfectant system is configured to disinfect the filtered stream.

9. The system of claim 6, wherein the recovery system comprises a transfer pond, wherein the transfer pond is configured to direct the residual portion of the first stream from the raceway toward a reef pond fluidly coupled to the transfer pond.

10. A seawater intake system for generating and transferring filtered seawater to an input device, comprising:
an intake screen having an operable cross-section configured to screen and pass seawater therethrough and to produce screened intake seawater, wherein the screened intake seawater comprises fish and larvae;
a raceway fluidly coupled to the intake screen and comprising a walled container having a base, a first sidewall, and a second sidewall, wherein the raceway comprises a raceway inlet disposed at a first end of the raceway and a first raceway outlet disposed at a second end of the raceway, substantially opposite the first end, and the raceway is configured to receive the screened intake seawater via a conduit extending between the intake screen and the raceway inlet and to flow the screened intake seawater along a flow path extending between the raceway inlet and the first raceway outlet;
a cross flow screen disposed within the raceway and configured to enable a flow of a first portion of the screened intake seawater in a first flow direction that is different from a second flow direction of a second portion of the screened intake seawater in the raceway, wherein the first flow direction is cross flow relative to the second flow direction, thereby generating a residual stream in the raceway from the first portion of the screened intake seawater and a filtered stream from the second portion of the screened intake seawater, wherein the cross flow screen comprises a wedgewire screen positioned above the base of the walled container and extending along a length of the first and second sidewalls between the first and second ends of the raceway such that the wedgewire screen circumscribes the flow path of the screened intake seawater along a length of the raceway, and the wedgewire screen is configured to remove at least a portion of the fish and larvae from the second portion of the screened intake seawater to generate the filtered stream and the residual stream;
an intake flow system fluidly coupled to a second raceway outlet, separate from the first raceway outlet, wherein the intake flow system is configured to receive the filtered stream from the second raceway outlet and to provide the filtered stream to the input device; and
a recovery system fluidly coupled to the first raceway outlet and configured to receive the residual stream from the first raceway outlet.

11. The seawater intake system of claim 10, wherein an operational cross-sectional area of the intake screen is larger than an operational cross-sectional area of the raceway.

12. The seawater intake system of claim 11, wherein a flow rate through the raceway is approximately two to four times a flow rate through the intake screen.

13. The seawater intake system of claim 10, comprising a baffle upstream of the intake screen.

14. The seawater intake system of claim 10, wherein the recovery system is fluidly coupled to a reef pond configured to receive the residual stream from the raceway.

15. The seawater intake system of claim 14, wherein the recovery system further comprises:
a first pond configured to receive the residual stream from the first raceway outlet; and
a pumping system configured to pump the residual stream from the first pond into the reef pond.

16. The seawater intake system of claim 15, wherein the pumping system is configured to facilitate a flow of fish from the first pond to the reef pond.

17. The seawater intake system of claim 14, comprising an aerator positioned between the raceway and the reef pond.

18. The seawater intake system of claim 10, comprising a pH adjustment system disposed downstream of the second raceway outlet and configured to receive the filtered stream.

19. The seawater intake system of claim 10, comprising a disinfectant system disposed downstream of the second raceway outlet and configured to receive the filtered stream.

20. The seawater intake system of claim 10, wherein the intake screen is positioned above a sea floor.

21. The seawater intake system of claim 10, wherein the intake flow system comprises:
a sump configured to receive the filtered stream; and
a pump configured to discharge the filtered stream from the sump into an intake port of a desalination plant.

22. The seawater intake system of claim 21, wherein the pump is configured to operate at a pressure to direct a level of water in the sump to be lower than a sea level.

23. A seawater intake system for generating and transferring screened seawater to a desalination plant, comprising:
an intake screen having an operable cross-section configured to screen and pass seawater therethrough and to produce screened intake seawater, wherein the screened intake seawater comprises fish and larvae;
a raceway fluidly coupled to the intake screen and comprising a raceway inlet disposed at a first end of the raceway and a first raceway outlet disposed at a second end of the raceway, substantially opposite the first end, wherein the raceway is configured to receive the screened intake seawater via a conduit extending between the intake screen and the raceway inlet and to flow the screened intake water along a flow path extending between the raceway inlet and the first raceway outlet, an operational cross-sectional area of the intake screen is larger than an operational cross-sectional area of the raceway, and a flow rate through the raceway is approximately two to four times a flow rate through the intake screen, wherein the raceway comprises a walled container having a base, a first sidewall, and a second sidewall;
a cross flow screen disposed within the raceway and configured to enable a flow of a first portion of the screened intake seawater in a direction which is in cross flow with a second portion of the screened intake seawater to draw the first portion of the screened intake seawater from the raceway, wherein the second portion of the screened intake seawater is directed to flow in the direction of the raceway during operation of the seawater intake system, the first portion of the screened intake seawater flowing in the cross flow direction is directed out of the raceway during operation of the seawater intake system, the cross flow screen comprises a wedgewire screen positioned above the base of the walled container and extending along a length of the raceway between the first and second ends such that the wedgewire screen circumscribes the flow path of the screened intake seawater along the length of the raceway, and the wedgewire screen is configured to remove at least a portion of the fish and larvae from the screened intake water;
an intake flow system fluidly coupled to the raceway via a second raceway outlet, separate from the first raceway outlet, wherein the intake flow system comprises:
a sump configured to receive the first portion of the screened intake seawater;
a pump configured to direct the first portion of the screened intake seawater from the sump into an intake port of the desalination plant; and
a recovery system fluidly coupled to the first raceway outlet and configured to direct the second portion of the screened intake seawater to a sea environment, wherein the recovery system comprises:
a first pond configured to receive the second portion of the screened intake seawater; and
a pumping system configured to pump the second portion of the screened intake seawater from the first pond into a reef pond fluidly coupled to the recovery system.

24. The seawater intake system of claim 23, comprising a baffle upstream of the intake screen.

25. The seawater intake system of claim 23, comprising an aerator positioned between the pumping system and the reef pond.

26. The seawater intake system of claim 23, comprising a pH adjustment system in fluid communication with the sump.

27. The seawater intake system of claim 23, comprising a disinfectant system in fluid communication with the sump.

28. The seawater intake system of claim 23, wherein the cross flow screen comprises a cylindrical screen.

* * * * *